United States Patent [19]
Kobayashi et al.

[11] 3,884,790
[45] May 20, 1975

[54] APPARATUS FOR ELECTROLYTICALLY ETCHING
[75] Inventors: Kazuhiko Kobayashi, Seto; Tamio Takawashi, Nagoya; Shinji Arai, Nagoya, all of Japan
[73] Assignee: Mitsubishi Denki Kabushiki Kaisha, Japan
[22] Filed: June 29, 1973
[21] Appl. No.: 374,960

[30] Foreign Application Priority Data
July 5, 1972 Japan.............................. 47-67216

[52] U.S. Cl. ............................ 204/224 M; 204/228
[51] Int. Cl. ........................... B23p 1/02; B01k 3/00
[58] Field of Search ..................... 204/228, 224 M

[56] References Cited
UNITED STATES PATENTS
| 3,650,940 | 3/1972 | Bardahl............................ | 204/224 M |
| 3,761,366 | 9/1973 | Drushel........................... | 204/228 X |
| 3,761,380 | 9/1973 | Ballard............................. | 204/228 |
| 3,779,888 | 12/1973 | Bardahl et al. ..................... | 204/228 |

Primary Examiner—John H. Mack
Assistant Examiner—D. R. Valentine
Attorney, Agent, or Firm—Oblon, Fisher, Spivak, McClelland & Maier

[57] ABSTRACT

An apparatus for electrolytically etching a workpiece comprises means for interrupting a power source quickly when an abnormal phenomenon occurs, and means for accurately detecting an abnormal current attenuation occuring between an electrode and a workpiece.

In the apparatus for electrolytically etching a workpiece, a saturable reactor constant voltage automatic controlling system is employed for the electrolytic etching power source, and in order to decrease the size of an interrupting thyristor and to complete the interrupting of the working current; an interrupting diode is inserted between the saturable reactor, a stepdown transformer and a three phase full wave rectification, and the interrupting thyristor is connected to the output and is turned on by an abnormal phenomenon detecting signal so that the feed to the workpiece and the electrode is stopped by a short circuit of the three phase alternating current between the saturable reactor and the stepdown transformer.

The abnormal phenomenon occuring between the electrode and the workpiece in the electrolytic etching, is detected by employing a sample and hold circuit, an operational amplifier and a logic circuit to prevent damage to the electrode and the workpiece.

Further, an apparatus for electrolytically etching a workpiece wherein an abnormal current attenuation is detected with high accuracy is provided so that the ripple component of the working power source due to a spark or voltage change component caused by electrical noise and spark, is detected with high accuracy.

6 Claims, 15 Drawing Figures

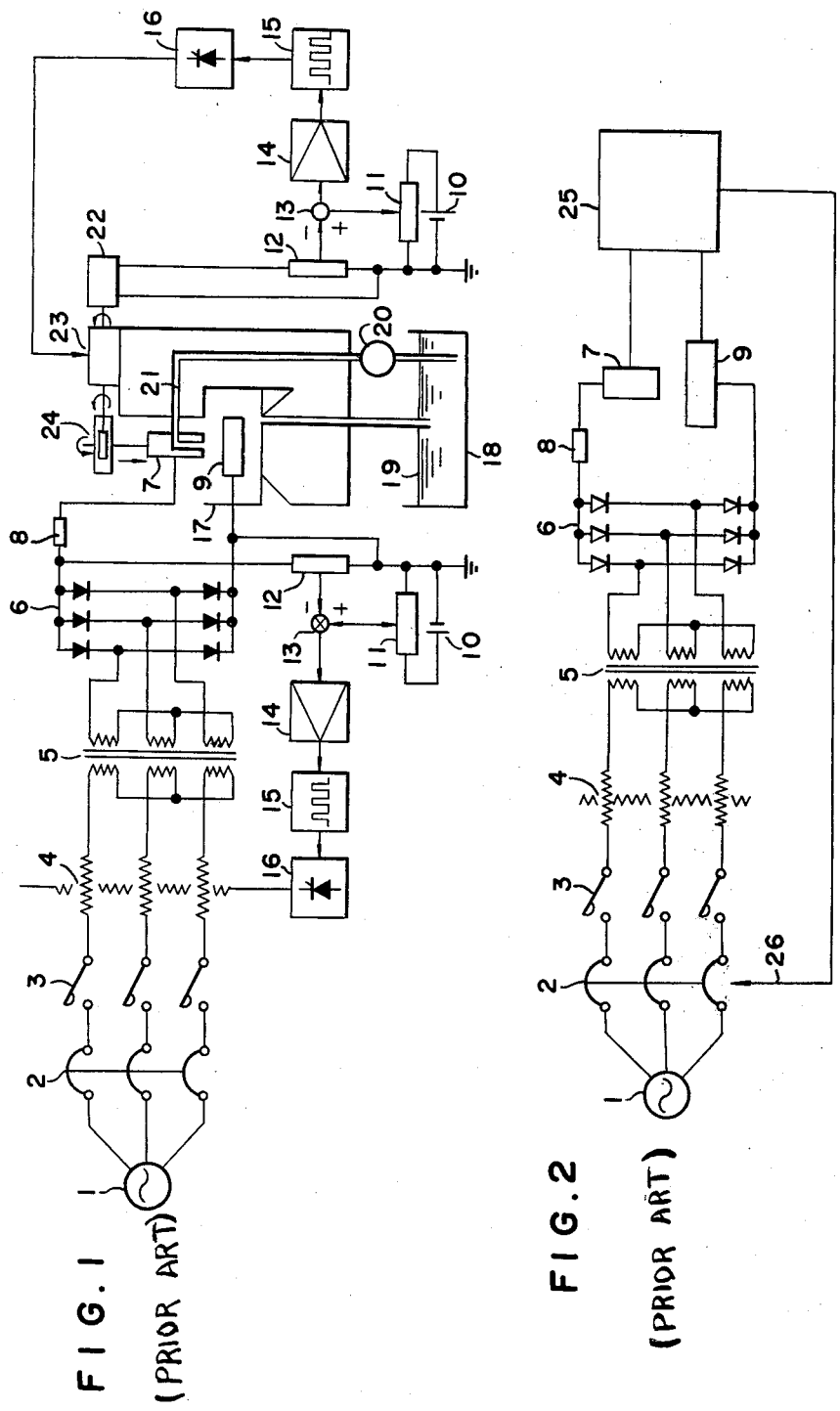

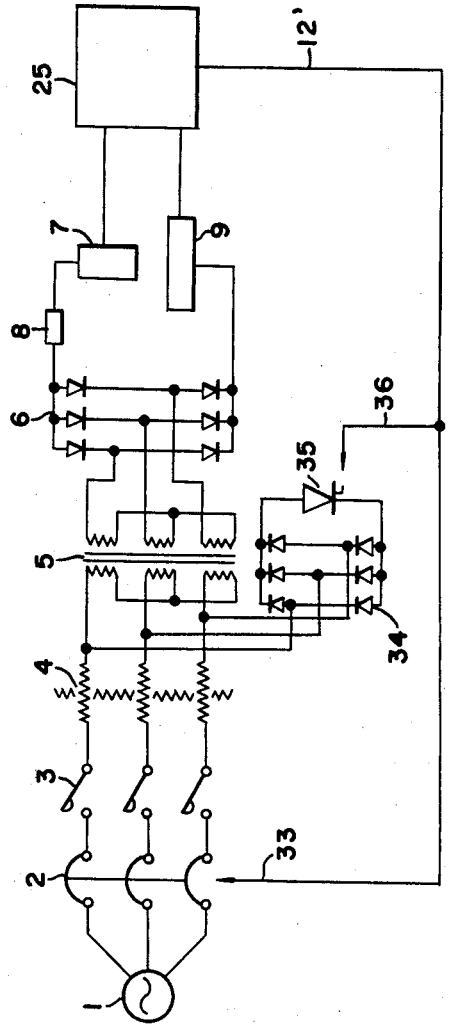
F I G. 4

APPARATUS FOR ELECTROLYTICALLY ETCHING

BACKGROUND OF THE INVENTION

1. Field of the Invention

The present invention generally relates to an apparatus for electrolytically etching a workpiece and more particularly to a new and improved unique electrolytic etching apparatus wherein a primary side of alternating current of a working power source is short circuited by a diode and a thyristor which is actuated by a signal generated in response to an abnormal phenomenon occuring between an electrode and a workpiece in an electrolytic etching, thereby interrupting the working power source.

This invention further relates to a unique apparatus for providing said signal for detecting the abnormal phenomenon occuring between the electrode and the workpiece in said electrolytic etching, apparatus by employing a sample and hold circuit, an operational amplifier and a logic circuit.

2. Description of the Prior Art

In the past, an apparatus for electrolytically etching a workpiece usually comprised a controlling system shown in FIG. 1.

In FIG. 1, the reference numeral 1 designates a three phase alternating current power source; 2 designates a circuit breaker; 3 designates a switch; 4 designates a saturable reactor; 5 designates a stepdown transformer; 6 designates a rectifier connected to the secondary side of said transformer 5; 7 designates an electrode connected through a shunt 8 to a negative pole of said rectifier 6; 9 designates a workpiece connected to the positive pole of said rectifier 6 and facing said electrode 7 through a small gap; 10 designates a reference voltage generator; 11 designates a reference voltage adjustor; 12 designages a detected voltage adjuster; 13 designates a comparator for comparing the voltage generated from said adjusters 11, 12; 14 designates an amplifier; 15 designates an igniter which controls said saturable reactor 4 and a thyristor 16 for driving a DC servomotor; 17 designates a working vessel; 18 designates a tank; 19 designates an electrolyte; 20 designates a pump for supplying said electrolyte 19 in said tank 18 through a pipe 21 to a working gap; 22 designates a speed indication dynamo; 23 designates a DC servomotor and 24 designates a reduction gear.

In the past, the constant voltage automatic control has been provided by using the reference voltage generator 10, the reference voltage adjuster 11, the detective voltage adjuster 12, the comparator 13, the amplifier 14, the igniter 15, the thyristor 16 and the saturable reactor 4; and the constant speed feed automatic control has been provided by using the speed indicate dynamo 22, the reference voltage generator 10, the reference voltage adjuster 11, the detected voltage adjuster 12, the comparator 13, the amplifier 14, the igniter 15 and the thyristor 16.

In order to prevent damage to the electrode and the workpiece by a signal detecting an abnormal phenomenon such as a spark, or an abnormal current attenuation phenomenon occuring between the electrode and the workpiece (which is caused by abnormal formation of strong oxidized membrane), the apparatuses as shown in FIGS. 2 and 3 were used.

The apparatus of FIG. 2 was to prevent damage of the electrode 7 and the workpiece 9 by detecting an abnormal phenomenon with an abnormal phenomenon detector 25 and turning off the breaker 2 of the primary side of the working power source by the breaker breaking signal 26.

In said apparatus, a delay in time between detecting the abnormal phenomenon and breaking the working power source, is about several tens of milliseconds so that damage to the electrode 7 and the workpiece 9 was severe. When the abnormal phenomenon occured, it took a great deal of time to correct the electrode.

The apparatus of FIG. 3 was to provide a constant voltage automatic control by using a thyristor stack 27 instead of the saturable reactor 4 of FIG. 2, and was to improve the breaking system of FIG. 2. That is, in the apparatus, a working gap shorting thyristor 28 was inserted in parallel between the electrode 7 and the workpiece 9, and also a diode for calibrating thyristor forward voltage drop was inserted in series between the electrode 7 and the workpiece 9 so that the forward voltage drop of the diode 29 was applied to the working gap shorting thyristor 28 so as to turn on the thyristor 28 even when the abnormal phenomenon caused the electrode 7 to contact the workpiece 9.

In operation, an abnormal phenomenon was detected with the abnormal phenomenon detector 25 so that the thyristor 28 was turned on by a thyristor ignition signal 30 based on the detecting signal to apply voltage corresponding to the thyristor voltage drop in the pole gap, and the constant voltage automatic control thyristor stack 27 was turned off by the signal 31 for turning off the thyristor stack. Further, the switch 3 and the breaker 2 were turned off by the signal 32 and the signal 33 respectively. Finally, the working power source was turned off to prevent damage to the electrode 7 and the workpiece 9.

In accordance with the above apparatus, it took only several tens of microseconds to interrupt the voltage between the electrode 7 and the workpiece 9 by detecting the abnormal phenomenon. However, the voltage corresponding to the forward voltage drop of the thyristor 28 remained between poles so that the working current could not be completely interrupted. Many thyristors connected in parallel had to be used when a working current capacity of the thyristor 28 was in a range of several thousands to several ten thousands of amperes. In this case, it was difficult to turn on simultaneously all of the elements by giving balance of all of the elements, and many thyristors were required and the cost of the apparatus was high. Moreover, it was necessary to connect the diode 29 for calibrating the thyristor forward voltage drop, in series between the electrode 7 and the workpiece 9. The diode 29 had to have the same capacity as that of the working power source rectifier 6, so that the cost of the apparatus was high in addition to the thyristor 28 and the working current could not be completely broken. When the thyristor 28 was turned on, it was possible to destroy the thyristor 28 because there was no element for limiting the current in the power source circuit.

Moreover, in prior art conventional apparatuses for electrolytically etching a workpiece, an abnormal phenomenon occuring between the electrode and the workpiece during the electrolytic working, was detected by said abnormal phenomenon detector 25.

In conventional systems for detecting the spark of an abnormal phenomenon occuring between the electrode and the workpiece during the electrolytical working, it was known to use a system for generating a signal when a detected voltage decreased due to a spark phenomenon by comparison of a predetermined reference voltage with the working gap voltage by using a transistor type voltage relay actuating at a lower level than the predetermined voltage.

It has been also known to use a system for detecting a small voltage change caused by a spark in the working gap voltage in comparison with the detected voltages of a differential operating circuit and an integral operating circuit by the combination of both circuits. However, in the former system, it was necessary to change the predetermined reference voltage when the average voltage was changed during operation, so that if was difficult to identify the ripple component of the working power source (pulse component) and the voltage change component caused by the spark in comparison of average working voltage, so that a spark detecting accuracy was low.

In the latter system, it was unnecessary to change the predetermined reference voltage when the average working voltage was changed; however, it was severely affected by electrical noise because of the differential circuit system, so that it was difficult to identify the ripple component of the working power source and the voltage change component caused by the spark in comparison with average working voltage, so that spark detecting accuracy was low.

In the past, there has not been any effective means for detecting a current abnormal attenuation phenomenon.

SUMMARY OF THE INVENTION

Accordingly, one object of the present invention is to provide a new and improved unique apparatus for electrolytically etching a workpiece without any difficulty caused by a current abnormal attenuation phenomenon.

It is another object of the present invention to provide a new and improved unique apparatus for detecting an abnormal current condition.

It is still another object of the present invention to provide a new and improved unique apparatus for identifying the ripple component of the working power source and the voltage change component caused by a spark.

It is yet another object of the present invention to provide an electrolytic etching apparatus which is economical to manufacture.

Briefly, in accordance with this invention, the foregoing and other objects are in one aspect attained by the provision of an apparatus which comprises a saturable reactor constant voltage automatic control system shown in FIG. 1 as a working power source wherein a diode for interruptions is inserted between the saturable reactor and the stepdown transformer in order to decrease the size of a interrupting thyristor and to interrupt completely a working current. Three phase full wave rectification is performed and the interrupting thyristor is connected to the output of the rectifier so as to turn on the interrupting thyristor by an abnormal phenomenon detected singal, in order to short circuit the three phase alternative current between the saturable reactor and the stepdown transformer and to stop the feed to the workpiece and the electrode, whereby the interrupting thyristor can be turned on within several microseconds from receiving the abnormal phenomenon detected signal, and the three phase alternating current between the saturable reactor and the stepdown transformer can be short circuited.

In the apparatus of this invention, an output portion of the saturable reactor in the working voltage circuit, is short circuited so that the current capacity of the interrupting thyristor can be remarkably decreased by the current limiting operation of the saturable reactor in comparison with the conventional system. Accordingly, it is possible to interrupt the circuit by using only one interrupting thyristor by combining a three phase full wave rectifier diode.

In the interrupting of the working current, a delay is caused only by the inductance component of the stepdown transformer, the electrode and the workpiece, so that the voltage corresponding to the interrupting thyristor forward voltage drop component, is reduced to several one-tenths and the effect of the voltage is not found and the interrupting of the working current can be remarkably fast.

In order to prevent the delay for interrupting the working current by the inductance component of the stepdown transformer, the electrode and the workpiece, the apparatus of this invention comprises a working gap shorting thyristor and a bias-condenser for the working gap shorting thyristor inserted between the workpiece and the electrode so as to bias the cathode of the working gap shorting thyristor negatively by the condensor, and to turn on the interrupting thyristor by the abnormal phenomenon detecting signal, simultaneously turning on the working gap shorting thyristor, whereby the delay for interrupting the working current caused by the inductance component of the stepdown transformer, the electrode and the workpiece, is prevented by forcibly shunting the current to the working gap shorting thyristor so as to interrupt the working current passing in the gap between the electrode and the workpiece within several microseconds.

It has been necessary to insert a diode for calibrating thyristor forward voltage drop when the working gap shorting thyristor is inserted between the electrode and the workpiece. However, in accordance with the apparatus of this invention, it is unnecessary to use the diode for calibrating thyristor forward voltage drop for forcedly turning on the thyristor by using a condenser for biasing the working gap thyristor.

Moreover, in accordance with the apparatus of this invention, the abnormal phenomenon is detected by the following manner.

A sample and hold circuit is used for repeating the sample and hold by a frequency (several $KH_z$ — several $MH_z$) higher than the working power source ripple frequency, and a subtraction of the output voltage of the sample and hold circuit at a holding time from the input voltage at the holding time is accomplished by using an operation amplifier to detect the differential voltage in a short time interval whereby the effect of the ripple component of the working power source is cancelled to remarkably increase the accuracy for detecting spark. The sample and hold circuit applies an output voltage following an input voltage by a specific time interval by a sampling instruction signal to the minor voltage change from the spark of an abnormal phenomenon in the working gap, and also stores an input voltage at the finish of the sampling by a holding instruction signal and maintains the voltage as an output voltage until receiving the next sampling instruction signal.

Moreover, in accordance with the apparatus of this invention, a small change of the working current caused by a spark is detected by using the sample and hold circuit, so as to synchronise the small changes with the sample and hold circuit. Accordingly, a small voltage change at the spark, is detected whereby the sample and hold is performed and the spark phenomenon is detected by the abnormal phenomenon detection circuit and the spark detecting accuracy is further increased.

In a high pressure gas charge working system which is an effective means for improving the accuracy of an electrolytic etching, bubbles are present in the electrolyte and the working voltage and the working current are changed depending upon the degree of the contamination of the bubbles.

Accordingly, it has been difficult to find a change of the working voltage and the working current caused by the spark and the gas in accordance with the conventional spark detecting system. However, when a sample and hold circuit and a logic circuit are used, it is possible to detect a small voltage rise of the working voltage and a small attenuation of the working current caused by the contamination of high pressure gas and a small voltage drop of the working voltage and a small current increase of the working current by the formation of spark, by using a logic circuit, so that spark detecting accuracy is remarkably increased in the high pressure gas charge working system.

In the abnormal attenuation of current caused by abnormal formation of a strong oxide membrane, the working current is converted to a voltage proportional to the working current by using a shunt, and the voltage can be detected as abnormal attenuation of current by using the sample and hold circuit and the abnormal phenomenon detection circuit. In said case, an abnormal attenuation can be detected within several seconds - several tens of seconds so that the period between the sampling time and the holding time of the sample and hold circuit, can be about several seconds to several tens of seconds, and differential voltages in each period are detected to derive the abnormal attenuation of current by the abnormal phenomenon detection circuit.

BRIEF DESCRIPTION OF THE DRAWINGS

A more complete appreciation of the invention will be readily obtained as the same becomes better understood by reference to the following detailed description when considered in connection with the following drawings, wherein:

FIG. 1 is an explanatory block diagram of one embodiment of a conventional apparatus for electrolytical etching;

FIGS. 2 and 3 are respectively an explanatory block diagram of a conventional apparatus for electrolytical etching by breaking a working power source;

FIG. 4 is an explanatory block diagram of one embodiment of the apparatus in accordance with this invention;

DETAILED DESCRIPTION OF THE PREFERRED EMBODIMENTS

Figure 3:
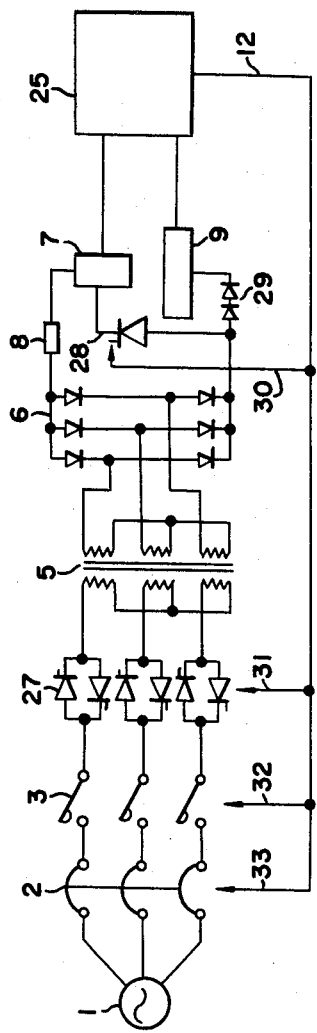

Referring now to the drawings, wherein like numerals designate identical, or corresponding parts throughout the several views, and more particularly to FIG. 4 thereof one preferred embodiment of an apparatus for electrolytically etching according to this invention is illustrated.

In FIG. 4, the reference numeral 34 designates an interrupting diode connected in parallel between a saturable reactor 4 and the primary side of a transformer 5; 35 designates an interrupting thyristor connected to both of the poles of the diode 34; 12' designates an abnormal phenomenon detecting signal; 36 designates an ignition signal of the interrupting thyristor 35 and the other parts are same as those of the conventional apparatus shown in FIG. 2, and will be omitted in the following description.

When an abnormal phenomenon occurs between an electrode 7 and a workpiece 9, the interrupting thyristor 35 is turned on by the ignition signal 36 based on the abnormal phenomenon detecting signal 12', and the primary side of the transformer 5 is shortcircuited to interrupt the working power source and simultaneously the circuit breaker 2 is opened by the breaking signal 33.

Figure 5:
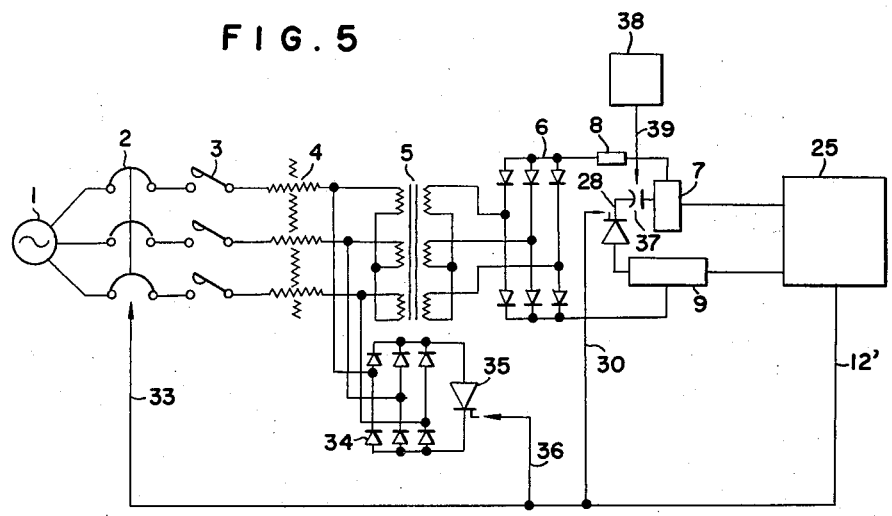
FIG. 5 is an explanatory block diagram of another embodiment of the apparatus in accordance with this invention.

Another preferred embodiment of this invention is shown in FIG. 5 wherein a working gap shorting thyristor 28 connected in series with a bias condenser 37 for the thyristor 28, is inserted between the electrode 7 and the workpiece 9 of FIG. 4. The condenser 37 is charged by a condenser charging signal 39 originating from a charging circuit 38.

When an abnormal phenomenon occurs within the working gap, it is detected by the abnormal phenomenon 25 and the thyristor 35 is turned on by the interrupting thyristor ignition signal 36 based on the abnormal phenomenon detecting signal 12 so that the circuit portion adjacent the saturable reactor 4 that is the primary side of the transformer 5 is shorted to interrupt the working power source and simultaneously the thyristor 28 is turned on by the working gap shorting thyristor ignition signal 30 so as to prevent a delay for interrupting the working current caused by the inductance components of the stepdown transformer 5, the electrode 7 and the workpiece 9, and simultaneously to open the circuit breaker 2 and to cut the working power source by the breaking signal 33.

In accordance with this invention, in order to interrupt the working power source by a signal for detecting an abnormal phenomenon occuring in an electrolytical etching, it is possible to forcibly shorting the circuit between the saturable reactor of the working power source and the stepdown transformer within several microseconds by the three phase full wave rectifier diode and the thyristor.

In said case, the current capacities of the diode and the thyristor can be quite small because of the dropping characteristics (current limiting characteristics) of the saturable reactor, as the circuit portion adjacent the saturable reactor is short circuited. The voltage corresponding to the forward voltage drop component of the thyristor is dropped by the stepdown transformer, so as to have no effect.

Moreover, in accordance with the apparatus of this invention, inserting a shorting thyristor and a cathode negative bias condenser between the electrode and the workpiece, the delay for interrupting the working current by the inductance of the stepdown transformer, the electrode, and the workpiece, can be decreased to within several microseconds as the working current is forcibly passed through the thyristor forward voltage drop.

The other preferred embodiment of this invention improves the abnormal phenomenon detector 25 shown in FIGS. 2 to 5.

Figure 6:
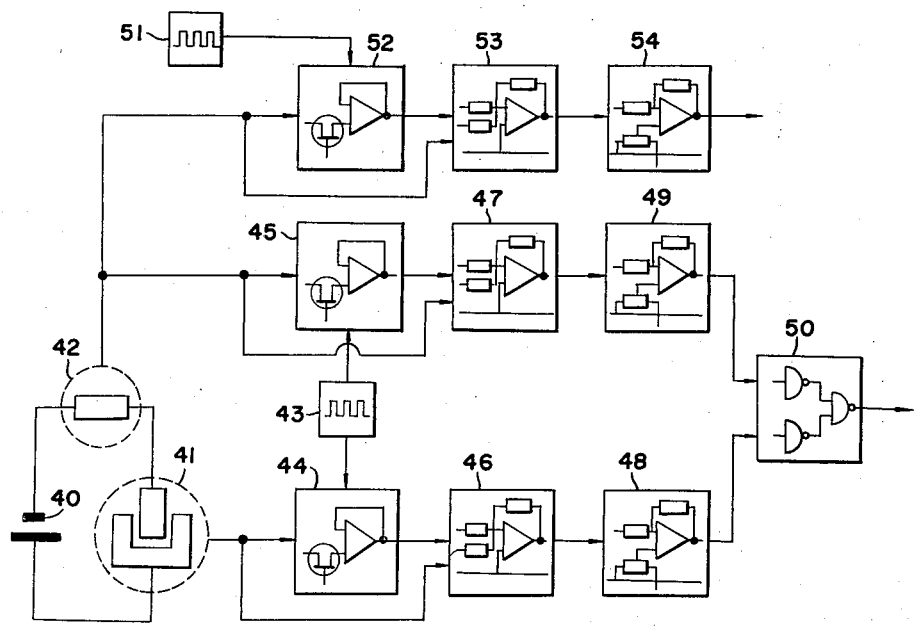
FIG. 6 is a block diagram of still another embodiment in accordance with this invention.

The improved abnormal phenomenon detector of this invention is shown in FIG. 6 wherein the reference numeral 40 designates a working power source; 41 designates a working gap (a gap between an electrode and a workpiece); 42 designates a shunt for converting the working current to a voltage wherein the working voltage is directly detected from the working gap and the working current is separately detected from a shunt.

The reference numeral 43 designates a sample and hold reference pulse generator for detecting a spark, which feed synchronous pulses, respectively to a working voltage sample and hold circuit 44, and a working current sample and hold circuit 45.

The reference numeral 46 designates a subtraction circuit for detecting a differential voltage by a subtraction operation of the working voltage from the sample and hold voltage; 47 designates a subtraction operation of the voltage converted from the working current by the shunt 42 (hereinafter referring to as a working current waveform) from the sample and hold voltage of the working current waveform; 48 and 49 designate level comparison circuits for comparing the differential voltage of outputs of the subtraction circuits 46 and 47 with the predetermined reference voltage; 50 designates a logic circuit for generating a spark detecting signal by detecting the spark component of the signal detected by the level comparison circuits 48 and 49; 51 designates a sample and hold reference pulse generator for detecting an abnormal current attenuation and the generator 51 feeding synchronous pulses to a working current sample and hold circuit 52; 53 designates a subtraction circuit for detecting a differential voltage by a subtraction operation of the working current waveform converted from the working current by the shunt 42, from the sample and hold voltage of the working current waveform; and 54 designates a level comparison circuit for comparing a differential voltage of the output of the subtraction circuit 53 with the predetermined reference voltage.

Figure 7:
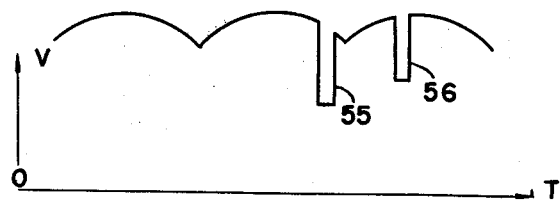
FIG. 7 is a waveform of a working voltage in this invention.

FIG. 7 shows a working voltage waveform impressed within the working gap; and 55 and 56 designate respectively spark voltage drops caused by a spark.

Figure 8:
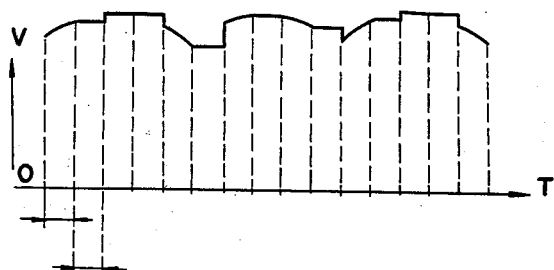
FIG. 8 is a waveform of a sample and hold of a working voltage in this invention.

FIG. 8 shows a sample and hold wave form of the working voltage wherein an output of the sample and hold circuit is produced by tracking the input working voltage during the sampling time, while the input voltage at the end of sampling is held during the holding time at the output of the sample and hold circuit.

Figure 9:
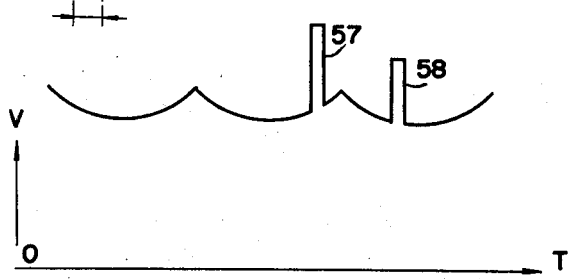
FIG. 9 is a waveform of a working current in this invention.

FIG. 9 shows a working current waveform converted from the working current to a voltage by the shunt and 57 and 58 designate respectively spark voltage rises caused by the spark, which correspond to the spark voltage drops 55 and 56 in FIG. 7.

When a spark occurs, the working voltage drops and the working current rises.

Figure 10:
FIG. 10 is a waveform of a sample and hold of a working current in this invention.

FIG. 10 shows a sample and hold waveform of the working current waveform wherein the output of the sample and hold circuit is produced by tracking the input working current during the sampling time, while the input current waveform at the end of sampling, is held during the holding time at the output of the sample and hold circuit.

Figure 11:
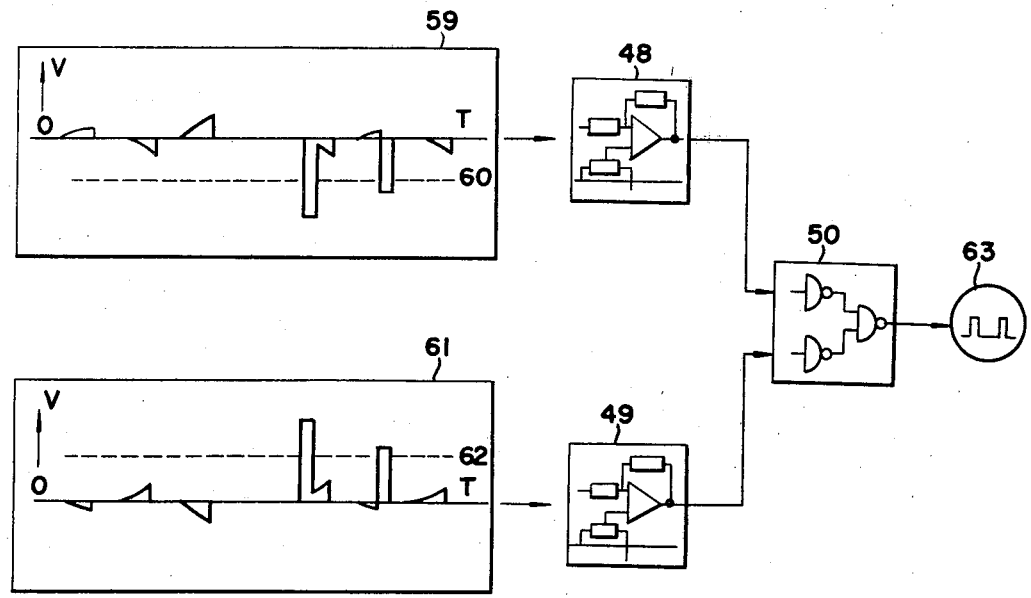
FIG. 11 is a block diagram of a spark detecting signal in this invention.

FIG. 11 shows treatments of the spark detecting signal, wherein 59 designates a signal treated by the subtraction circuit for the input voltage of the working voltage sample and hold circuit and the output of the sample and hold circuit; 60 designates a voltage drop detecting level. When the voltage is decreased to lower than the detecting level, a signal is generated by the level comparison circuit in the next step. The reference numeral 48 designates a working voltage drop level comparison circuit which compares the reference voltage and the voltage drop level to detect a voltage drop caused by a spark. The reference numeral 61 designates a signal treated by the subtraction circuit for the input waveform of the sample and hold circuit of the working current waveform and the output waveform of the sample and hold circuit; 62 designates a current rise detecting level.

When the voltage rises over the detection level, a signal is generated by the level comparison circuit in the next step. The reference numeral 49 designates a working current rise level comparison circuit for comparing the predetermined reference current and the current rise level to detect a rise of current caused by a spark; 50 designates a logic circuit for treating the voltage drop signal given by the spark of the working voltage and the current rise signal given by the spark of the working current, and has a function for identifying electrical noise and the spark; 63 designates a spark detecting signal treated by the logic circuit 50.

Figure 12:
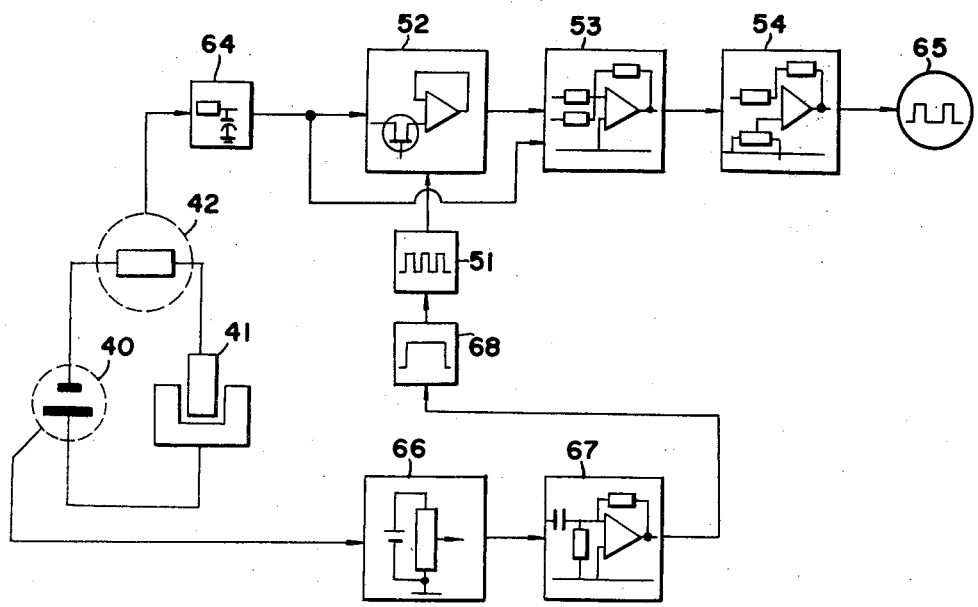
FIG. 12 is a block diagram of a current abnormal attenuation detecting circuit in this invention.

FIG. 12 shows a detailed structure of an abnormal current attenuation detecting circuit, wherein 64 designates a filter circuit for removing a high frequency ripple component of the working current waveform converted to a voltage by the shunt; 51 designates an abnormal current attenuation detecting sample and hold reference pulse generator; 52 designates an abnormal current attenuation detecting sample and hold circuit; 53 designates a subtraction circuit; 54 designates a level comparison circuit; and 65 designates an abnormal current attenuation detecting output. The circuit has a manually operated current decrease detecting circuit for finding the current decrease and the abnormal current attenuation.

The reference numeral 66 designates a working speed reference cell. The working current is charged corresponding to the change of the working speed. Accordingly, when the working speed reference cell potential is manually changed, the change of the potential is detected by a differential circuit 67 so that the sample and hold is performed after interlocking the abnormal current attenuation detecting sample and hold reference pulse generator 51 for a constant time to stabilize the working current in a normal condition.

Figure 13:
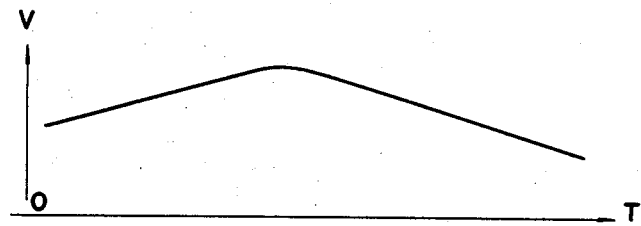
FIG. 13 is a waveform of a working current after passing through a filter in this invention.
Figure 14:
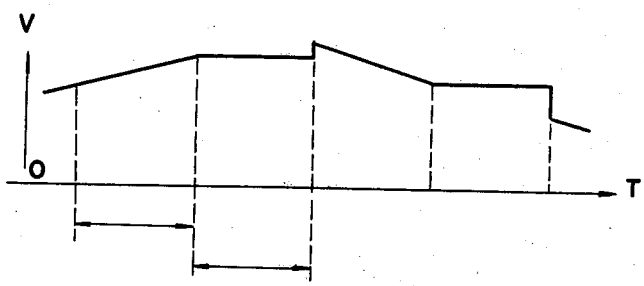
FIG. 14 is a waveform of output of a sample and hold circuit in this invention.
Figure 15:
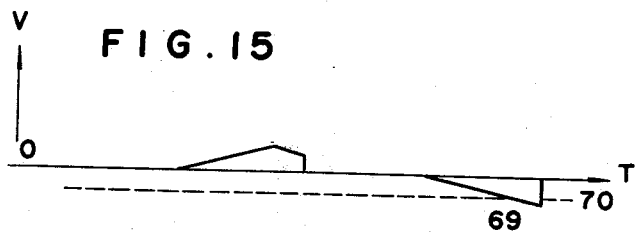
FIG. 15 is a waveform of an input working current in a sample and hold circuit and a waveform of signal from a subtraction circut by the output of the sample and hold circuit.

FIG. 13 shows a working current waveform passed from a filter circuit 64;

FIG. 14 shows a sample and hold circuit output waveform;

FIG. 15 shows a signal treated by the subtraction circuit 53 for the sample and hold circuit input working current waveform and the sample and hold circuit output. In FIG. 15, 69 designates an abnormal current attenuation; 70 designates an abnormal current attenuation detecting level. When the voltage decreases lower than the detecting level, a signal is generated by the level comparison circuit 54. Incidentally, in said embodiments, it has been described for usual working systems.

In the high pressure gas charge working system which is an effective manner for improving the working accuracy, the spark and abnormal current attenuation phenomenon is easily detected by using the sample and hold circuit, the operation amplifier and the logic operation circuit.

In accordance with this invention, the spark and abnormal current attentuation which is an abnormal phenomenon caused by the electrolytic etching, is detected by using a sample and hold circuit, an operational amplifier and a logic circuit, so that an abnormal current attenuation which has been heretofore difficult to detect, can now be detected with high accuracy. It is also possible to find the ripple component of the working power source or effect of electrical noise and the voltage change component caused by the spark for the spark phenomenon.

Obviously, numerous modifications and variations of the present invention are possible in light of the above teachings. It is therefore understood that within the scope of the appended claims, the invention may be practiced otherwise than as specifically described herein.

What is claimed as new and desired to be secured by Letters Patent of the United States is:

1. Apparatus for electrolytically etching a workpiece which comprises:
   a three phase saturable reactor having an input and an output,
   three phase alternating current transformer means having primary windings and second windings,
   rectifier means for rectifying three phase alternating current having three inputs and first and second outputs,
   an electrode,
   an abnormal phenomenon detector,
   means connecting the input of said three phase alternating current saturable reactor to a three phase alternating current power source,
   means connecting the output of said three phase alternating current saturable reactor to the primary windings of said three phase alternating current transformer means,
   means connecting the secondary windings of said three phase alternating current transformer means to the three inputs of said rectifier means,
   means connecting the first output of said rectifier means to said electrode,
   means for connecting the second output of said rectifier means to said workpiece,
   means connecting said abnormal phenomenon detector between said electrode and said workpiece;
   an interrupting thyristor,
   interrupting diode means,
   means connecting said interrupting diode in parallel with the primary windings of said three phase alternating current transformer means,
   means connecting said interrupting thyristor to the direct current output of said interrupting diode means,
   means connecting said abnormal phenomenon detector to said interrupting thyristor to short circuit the primary windings of said three phase alternating current transformer means in response to the detection of an abnormal phenomenon signal.

2. An apparatus according to claim 1, wherein a series connection of a thyristor and a condenser is coupled to said electrode for interrupting the working current delivered to said workpiece.

3. An apparatus according to claim 1, wherein the abnormal phenomenon detector measures the working current for a small time increment by using a sample and hold circuit and an operational amplifier so as to detect an abnormal current attenuation by an abnormal phenomenon detecting circuit.

4. An apparatus according to claim 1, wherein the abnormal phenomenon detector measures the working voltage and the working current for a small time increment by using a sample and hold circuit and an operational amplifier so as to detect a spark caused between the electrode and the workpiece by an abnormal phenomenon detecting circuit.

5. An apparatus according to claim 1, wherein the abnormal phenomenon detector includes:
   a working voltage sample and hold circuit for sampling and holding the working voltage;
   a working current sample and hold circuit for sampling and holding the working current;
   a reference pulse generator for feeding a sample and hold reference pulse to both of the sample and hold circuits;
   a subtracting circuit for obtaining a differential between sampled working voltages from the sample and hold voltage;
   a subtracting circuit for obtaining a differential voltage of a working current waveform from a sample and hold voltage of the waveform;
   a level comparison circuit for comparing both of the differential voltage and each predetermined reference voltage; and
   a logic circuit for generating spark detecting signal by detecting a spark component from the signal detected in the level comparison circuit.

6. An apparatus according to claim 1, wherein the abnormal phenomenon detector includes:
   a sample and hold circuit for sampling and holding the working current;
   a reference pulse generator for feeding a sample and hold reference pulse to said circuit;

a subtracting circuit for obtaining a differential voltage of the working current wave form from a sample and hold voltage of the working current waveform;

a level comparison circuit for comparing said differential voltage and the predetermined reference voltage; and a logic circuit for generating an abnormal current attenuation signal by detecting an abnormal current attenuation component from the signal detected by the level comparison circuit.

* * * * *